(12) United States Patent
Perry et al.

(10) Patent No.: US 10,272,335 B2
(45) Date of Patent: *Apr. 30, 2019

(54) SYSTEMS AND METHODS OF SERVING GAME VIDEO FOR REMOTE PLAY

(71) Applicant: SONY INTERACTIVE ENTERTAINMENT AMERICA LLC, San Mateo, CA (US)

(72) Inventors: David Perry, Monarch Beach, CA (US); Rui Filipe Andrade Pereira, Aliso Viejo, CA (US)

(73) Assignee: Sony Interactive Entertainment America LLC, San Mateo, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/360,469

(22) Filed: Nov. 23, 2016

(65) Prior Publication Data

US 2017/0072309 A1 Mar. 16, 2017

Related U.S. Application Data

(63) Continuation of application No. 14/083,381, filed on Nov. 18, 2013, now Pat. No. 9,539,508, which is a
(Continued)

(51) Int. Cl.
*A63F 9/00* (2006.01)
*A63F 13/355* (2014.01)
(Continued)

(52) U.S. Cl.
CPC .......... *A63F 13/355* (2014.09); *A63F 13/12* (2013.01); *A63F 13/30* (2014.09); *A63F 13/358* (2014.09);
(Continued)

(58) Field of Classification Search
None
See application file for complete search history.

(56) References Cited

U.S. PATENT DOCUMENTS 6,102,969 A * 8/2000 Christianson ..... G06F 17/30864
707/999.002
7,090,577 B2 * 8/2006 Serizawa .............. A63F 13/005
463/29
(Continued)

OTHER PUBLICATIONS

Wiegand ("Overview of the H.264/AVC Video Coding Standard" IEEE Trans. on Circuits and System for Video Technology, 2003).*

*Primary Examiner* — Seng Heng Lim
(74) *Attorney, Agent, or Firm* — Penilla IP, APC

(57) ABSTRACT

Methods and systems are provided for executing video games by a gaming computer and enabling remote play. In example, a method includes receiving a command from a first player via a first client and a computing network. The method updates a game state of a video game based on the command received from the first player and receiving a first point of view of the first player via the computing network. The method communicates at least part of the game state to a first image generator executed by the gaming computer and sends via the computing network to the first client a first image based on the game state and the first point of view using the first image generator. The first image is configured for rendering by the first client. The first image is a video image of a plurality of video images presented to the first client, which is accessing the gaming computer for remote play.

17 Claims, 6 Drawing Sheets

Related U.S. Application Data continuation of application No. 13/231,873, filed on Sep. 13, 2011, now Pat. No. 8,613,673, which is a continuation-in-part of application No. 12/826,130, filed on Jun. 29, 2010, now Pat. No. 8,968,087, and a continuation-in-part of application No. 12/826,489, filed on Jun. 29, 2010, now Pat. No. 8,888,592, and a continuation-in-part of application No. 12/334,819, filed on Dec. 15, 2008, now Pat. No. 8,147,339.

(60) Provisional application No. 61/421,163, filed on Dec. 8, 2010, provisional application No. 61/421,175, filed on Dec. 8, 2010, provisional application No. 61/407,898, filed on Oct. 28, 2010, provisional application No. 61/382,470, filed on Sep. 13, 2010, provisional application No. 61/014,036, filed on Dec. 15, 2007.

(51) Int. Cl.
    *A63F 13/30*      (2014.01)
    *A63F 13/358*      (2014.01)
    *A63F 13/77*      (2014.01)
    *A63F 13/70*      (2014.01)

(52) U.S. Cl.
    CPC .............. *A63F 13/70* (2014.09); *A63F 13/77* (2014.09); *A63F 2300/534* (2013.01)

(56) References Cited

U.S. PATENT DOCUMENTS

| | | | | |
|---|---|---|---|---|
| 7,096,253 B2* | 8/2006 | Vinson | ................... | G06F 9/445 709/203 |
| 7,448,063 B2* | 11/2008 | Freeman | ................... | G03C 1/26 348/157 |
| 7,804,856 B2* | 9/2010 | Krause | .............. | H04L 29/06027 370/486 |
| 8,560,643 B2* | 10/2013 | Kent | ......................... | G06T 9/00 463/42 |
| 2003/0228906 A1* | 12/2003 | Walker | .................... | G07F 17/32 463/40 |
| 2004/0157664 A1* | 8/2004 | Link | ....................... | A63F 13/10 463/43 |
| 2006/0058103 A1* | 3/2006 | Danieli | .................. | A63F 13/12 463/42 |
| 2006/0224761 A1* | 10/2006 | Howarth | .............. | H04N 21/235 709/231 |
| 2006/0230428 A1* | 10/2006 | Craig | ...................... | A63F 13/12 725/133 |
| 2007/0155507 A1* | 7/2007 | Gatto | ...................... | A63F 13/12 463/42 |
| 2008/0207322 A1* | 8/2008 | Mizrahi | .................. | A63F 13/12 463/32 |
| 2008/0234047 A1* | 9/2008 | Nguyen | .................. | G07F 17/32 463/42 |
| 2010/0122184 A1* | 5/2010 | Vonog | ................... | G06F 3/0486 715/753 |
| 2010/0167816 A1* | 7/2010 | Perlman | .................. | A63F 13/12 463/30 |
| 2010/0248817 A1* | 9/2010 | Anderson | ............... | G07F 17/32 463/25 |
| 2011/0055732 A1* | 3/2011 | Dawson | .............. | G06F 3/04815 715/757 |
| 2012/0158883 A1* | 6/2012 | Ikenaga | .................... | G06F 9/06 709/213 |
| 2014/0187331 A1* | 7/2014 | Kim | ....................... | A63F 13/12 463/42 |

\* cited by examiner

SYSTEMS AND METHODS OF SERVING GAME VIDEO FOR REMOTE PLAY

CLAIM OF PRIORITY

This application is a Continuation application of U.S. patent application Ser. No. 14/083,381, filed on Nov. 18, 2013, and entitled "Intelligent Game Loading," which is a Continuation application of U.S. patent application Ser. No. 13/231,873 filed on Sep. 13, 2011 (Now U.S. Pat. No. 8,613,673, issued on Dec. 24, 2013) and entitled "Intelligent Game Loading; which is, a continuation-in-part of U.S. patent application Ser. No. 12/334,819 filed Dec. 15, 2008 (Now U.S. Pat. No. 8,147,339, issued on Apr. 3, 2012) and entitled "Systems and Methods of Serving Game Video," and which claims priority to U.S. Provisional Application No. 61/014,036, filed on Dec. 15, 2007 and entitled "Systems and Methods of Serving Game Video";

a continuation-in-part of U.S. patent application Ser. No. 12/826,130 filed Jun. 29, 2010 (Now U.S. Pat. No. 8,968,087, issued on Mar. 3, 2015) and entitled "Video Game Overlay;" and a continuation-in-part of U.S. patent application Ser. No. 12/826,489 filed Jun. 29, 2010 (Now U.S. Pat. No. 8,888,592, issued on Nov. 18, 2014) entitled "Voice Overlay;" and U.S. patent application Ser. No. 13/231,873 claimed benefit and priority to U.S. provisional patent application No. 61/382,470 filed Sep. 13, 2010 and entitled "Add-on Management," U.S. provisional patent application No. 61/407,898 filed Oct. 28, 2010 and entitled "Dual-Mode Program Execution," U.S. provisional patent application No. 61/421,163 filed Dec. 8, 2010 and entitled "Intelligent Game Loading," and U.S. provisional patent application No. 61/421,175 filed Dec. 8, 2010 and entitled "Program Mode Switching."

The disclosures of all the above commonly owned patent applications are hereby incorporated herein by reference.

FIELD OF EMBODIMENTS

The invention is in the field of video games and more specifically in to field of video games provided over a computing network.

RELATED ART

Video games can generally be divided into two types, those that are provided locally and those that are provided over a computing network. Examples of video games that are provided locally include those played on a stand-alone game console such as the X-box™ by Microsoft™, the Game-Boy™ by Nintendo™ and the PlayStation™ by Sony™. These stand-alone game consoles include computing instructions configured to receive player input, to manage a state of the game, and to generate an image for display to the player. The stand-alone game consoles may also include a display on which the image is displayed, as in the Game-Boy™, or may be configured to output an analog video signal to an external display, as in the PlayStation™.

Examples of video games that are provided over a computing network include those that are played via the internet using a personal computer. These video games are provided using a remote server configured to send game state information and limited image information to clients via the computing network to one or more clients. The clients are configured to use the state information and limited image data to render an image that is displayed to a player. For example, the information sent by the remote server may include the locations of various objects in three dimensions and textures to be applied to these objects. The client will render an image using this information and a point of view of the player.

FIG. 1 illustrates a Game System of the prior art generally designated 100 and configured to provide a video game over a computing network. Game System 100 includes a Game Server 110 configured to communicate with one or more Client 115 via a Network 120. Game Server 110 receives player inputs from Client 115 and sends state and limited image information to Client 115. These player inputs, which may be received from multiple Clients 115, are used to maintain a game state and a may include, for example, commands to move, shoot, speak, or select an object. Game Server 110 sends state information and limited image information to Client 115 via Network 120. This limited image information is limited in that it includes merely surface textures, colors or images that have not yet been rendered to an image based on a specific point of view. As such, this limited image information must be rendered prior to display to a player. Generally, Game Server 110 is considered part of the server side of Game System 100 and Clients 115 is considered part of the client side. Server side and client side are defined relative to different sides of Network 120.

Game Server 110 includes a Global State Memory 125, Game Logic 130 and a Network Interface 135. Global State Memory 125 is configured to store a global state of the game. In a multi-player game this global state is based on player inputs received from multiple Clients 115. The global state includes, for example, positions and characteristics of player avatars, game objects, non-player characters, and the game environment. Game Logic 130 includes software, hardware or firmware configured to modify the global state in response to commands received from players and the current global game state. For example, Game Logic 130 can include rules of how avatars can interact with each other or the environment. Network Interface 135 is configured to convey all or part of the global game state and limited image information to one or more Client 115 via Network 120. Network Interface 135 is configured to communicate using, for example, TCP/IP protocols. An avatar is a game character representative of or controlled by a player.

Client 115 includes a Player Interface 140, a Local State Memory 145, an Image Renderer 150, Game Logic 155, and an optional Display 160. Player Interface 140 includes for example, a keypad, joystick or other input device. Local State Memory 145 is configured to store the state information received from Game Server 110. This state information may be modified by Game Logic 115 responsive to commands received via Player Interface 140. Any modification of the state information stored in Local State Memory 145 is typically communicated to Game Server 110 such that Global State Memory 125 can be updated accordingly.

Image Renderer 150 is configured to render an image based on the state information stored in Local State Memory 145, the limited image information received from Game Server 110, and a point of view of a player. For example, Image Renderer 150 may be configured to render an image from a point of view of a player's avatar based on three dimensional relationships between various other avatars, game objects, and non-player characters, and the game environment. Image Renderer 150 produces an image that can be displayed to a player using Display 160. Image Renderer 150 can include video processing logic such as that found in the GeForce Go 7900 GS by nVidia Inc. Typically, the memory and computing power available to Image Renderer 150 determines the quality and speed of images displayed to a player.

Display 160 may be part of a separate device such as a television set.

SUMMARY

Systems and methods of the invention include a video game architecture in which images are rendered remotely and delivered to a client via a computing network. At least part of the image rendering occurs on the server side of the video game architecture. This rendering is based on a point of view received from the client and a game state. At the client, the rendered video data is displayed to a player. In some embodiments, by rendering all or part of the images on the server side instead of on the client side, the memory and processing requirements of the client is reduced. For example, the client typically does not require an image renderer such as Image Renderer 150.

In one embodiment, a method is provided for executing video games by a gaming computer and enabling remote play. The method includes receiving a command from a first player via a first client and a computing network. The method updates a game state of a video game based on the command received from the first player and receiving a first point of view of the first player via the computing network. The method communicates at least part of the game state to a first image generator executed by the gaming computer and sends via the computing network to the first client a first image based on the game state and the first point of view using the first image generator. The first image is configured for rendering by the first client. The first image is a video image of a plurality of video images presented to the first client, which is accessing the gaming computer for remote play.

In an embodiment, a global game state is maintained by receiving player commands from a plurality of clients. All or part of this global game state is provided to a set of server side image generators each of which is configured to use the game state to render images based on player points of view received over a network. For example, a first member of the image generators may be assigned to generate images based on a point of view of a first avatar and a second member of the image generators may be assigned to generate images based on a point of view of a second avatar. The generated images are then sent via the computing network to different clients where they may be further processed and displayed to players.

In some embodiments, images are rendered for different types of clients by different image generators. For example, a first image generator may render images for display on a client having a 320 by 480 pixel display and minimal image processing power while a second image generated may render images for display on a client having a 1920 by 1080 pixel display and an ability to further render images.

In some embodiments, images received from a camera are included in the rendered video. These images optionally include real-time, e.g., live, video.

Various embodiments of the invention include a system comprising a state machine configured to maintain a state of a multi-player game, the state being responsive to inputs received from a plurality of clients; a first image generator configured to receive the state from the state machine and to at least partially render a first image based on the state and a point of view of a first player; a second image generator configured to receive the state from the state machine and to at least partially render a second image based on the state and a point of view of a second player; and a network interface configured to deliver the first image to a first of the clients and the second image to a second of the clients, over a computing network.

Various embodiments of the invention include a system comprising: a network interface configured to receive an image via a computing network and to deliver player commands to a game server via the computing network, the image including an image of a video game rendered by a game server based on a game state of the video game and a point of view of an avatar of a player; a player interface configured to receive the player commands from the player; and a display configured to display the image to the player.

Various embodiments of the invention include a method comprising: receiving a command from a first player via a first client and a computing network; updating a game state based on the command received from the first player; receiving a first point of view of the first player via the computing network; communicating at least part of the game state to a first image generator; rendering a first image based on the game state and the first point of view using the first image generator; and delivering the first image to the first player via the first client and the computing network.

Various embodiments of the invention include a method comprising: receiving a command from a player via a player interface; sending the received command to a game server via a computing network; receiving a compressed image from the game server via the computing network, the compressed image including an image of a video game rendered based on a game state of the video game and a point of view of an avatar of the player, the game state being based on the sent command; decompressing the compressed image; and displaying the decompressed image to the player.

DETAILED DESCRIPTION

Figure 1:
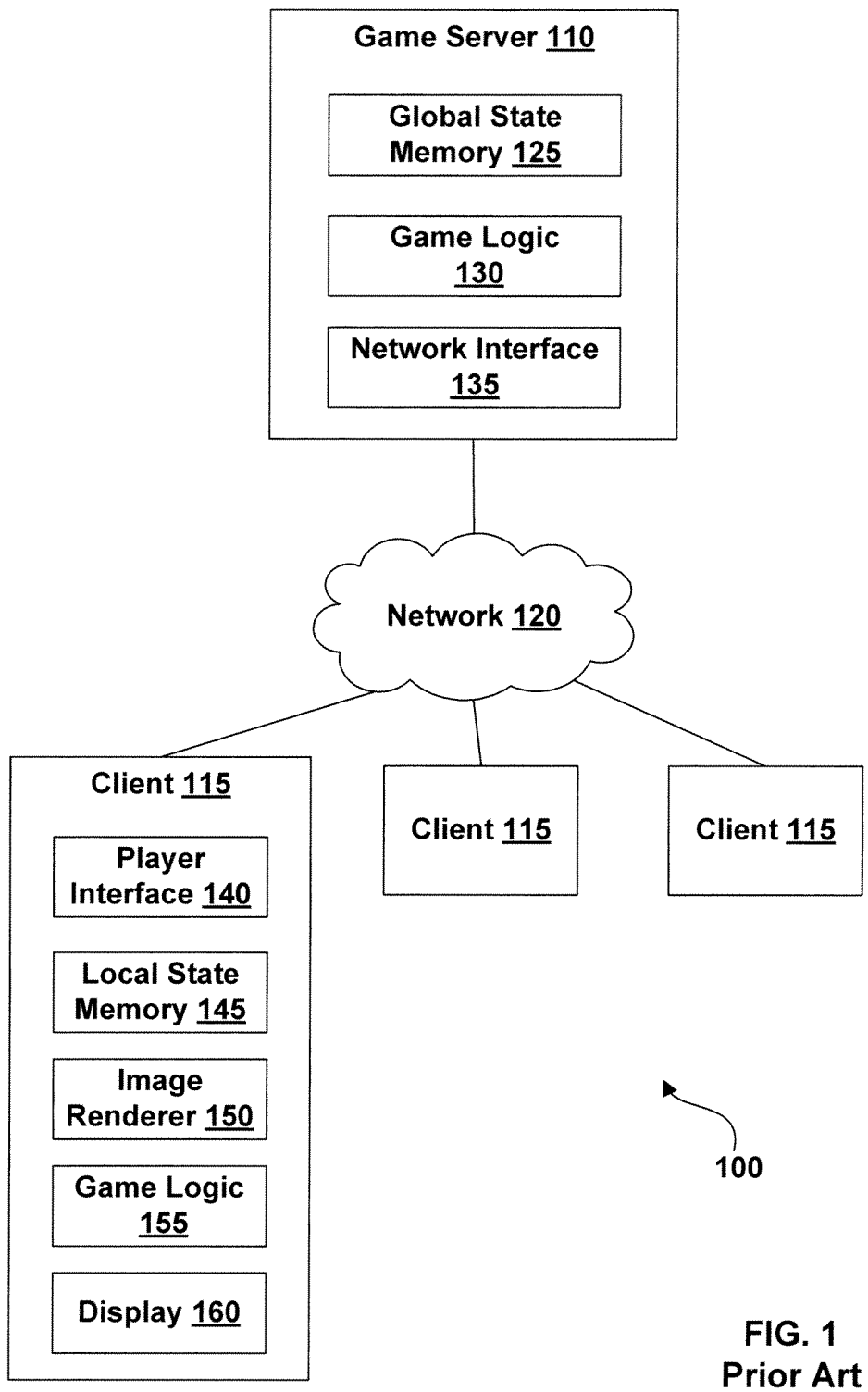
FIG. 1 illustrates a game system of the prior art configured to provide a video game over a computing network.

In various embodiments, the provision of a network based video game includes at least partial rendering of images using a server-side game server, prior to delivery of these images over a computing network, e.g. the internet. The rendered images are optionally also compressed prior to delivery over the computing network. Once received by a client, the rendered images are optionally decompressed, optionally further rendered, and displayed to a player of the video game. The rendered images are optionally part of a sequence of images that form a moving picture when viewed in order. The rendered images are optionally configured for specific display types, e.g., HDTV 1080p, 1080i, 720p, and may be for displays having 480 by 272, 480 by 234, 160 by 160, 320 by 240, 320 by 480, 800 by 600, 1024 by 768, 1280 by 720, 1280 by 800, 1280 by 1024, 1600 by 1200, 1920 by 1200, 1920 by 1080, and/or a larger or smaller number of pixels. The rendered images may be configured for interlaced or progressive displays.

Rendering that occurs on the server-side is typically based on a point of view of a player. This point of view may be the point of view of an avatar or from a position relative to the avatar. The point of view is one of the factors that determine what is shown in the rendered image. For example, the rendering may include occlusion of a distant object by a nearby object based on a specific point of view. This occlusion varies as a function of point of view. The rendering may further include application of shadows, bitmaps, lighting, patterns, and/or other textures.

Different image generators are optionally assigned to render images for different clients and/or players. Each of these image generators uses at least part of the same global game state. A global game state includes the positions and characteristics of avatars, non-player characters, game objects (e.g., chairs or vehicles), and the game environment (e.g., zones, instances and/or regions). In a multi-player game the global game state can include contributions from multiple players.

Multiple image generators are optionally used to provide rendered images to multiple clients. The image generators are optionally configured to render images configured for different client types and/or display types. For example, one image generator may render images configured for display on a mobile device (e.g., personal digital assistant or cellular telephone) having limited display area and computational power, while another image generator may render images for display on a larger display area and/or images that may be further rendered on the client.

The rendered images optionally include images generated using an external source. This external source may include a still camera, a video camera and/or an image storage. For example, in some embodiments, the rendered images include video of an event (e.g., sporting event, contest or game) recorded in real-time which is combined with images rendered based on a game state. The external source may include devices configured to identify the positions and/or identities of real world objects. These positions and/or identities are optionally used to control positions or identities of rendered objects within a game environment. For example, the position of a real world vehicle may be used to control the position of a computer rendered vehicle in a game. Likewise, a determined identity of a real works playing card may be used to set an identity of an in-game playing card. Devices configured to identify positions may include global or local positioning sensors, gyroscopes, inertia and acceleration sensors, and/or the like. Devices configured to identify identities may include image recognitions systems, barcode readers, RFID readers, electrical sensors, and/or the like.

Figure 2:
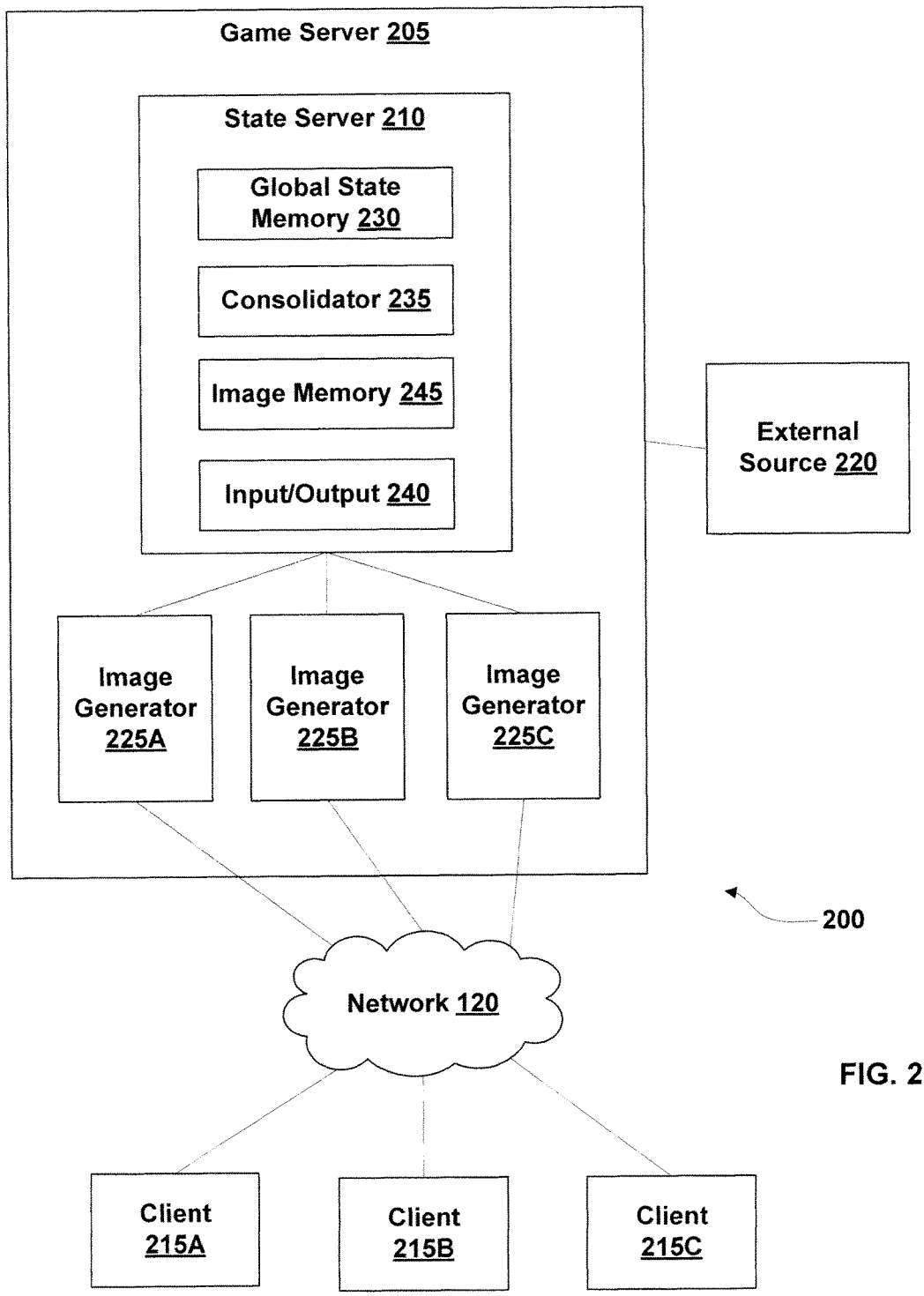
FIG. 2 illustrates a game system configured to provide a video game over a computing network, according to various embodiments of the invention.

FIG. 2 illustrates a Game System generally designated 200 and configured to provide a video game over a computing network, according to various embodiments of the invention. Game System 200 includes a Game Server 205, Network 120, one or more Clients 215, and an optional External Source 220. Clients 215 are individually referred to as Client 215A, Client 215B, Client 215C, etc. Generally, Game Server 205 is configured to generate one or more at least partially rendered image based on the point of view or one or more players, respectively. These images are communicated to Clients 215 via Network 120. Clients 215 are each configured to receive the at least partially rendered images, optionally perform further rendering, and to display the images to a player. Game Server 205 and Clients 215 are typically each controlled, owned and/or operated by different game players. For example, Game Server 205 may be managed in a first location by a game provider while Clients 215 are managed by separate game players in a variety of further locations geographically distant from the first location. Game Server 205 is configured to provide images to one, two, three, four, five, or more of Clients 215, each of Clients 215 having its own display. These images are optionally communicated to the Clients 215 over a computing network.

The displays of Clients 215 may include a two or three dimensional display device. For example, a two-dimensional computer screen or a three-dimensional display in which an image is presented within a three-dimensional volumetric space. The displays of Clients 215 may include a device configured to present a slightly different image to each eye of a user, e.g., 3D goggles. Three-dimensional displays may include lenticular displays, projected displays, polarized displays, or the like. The slightly different images are configured to create a three dimensional image for the user. In some embodiments, Clients 215 include one or more devices configured to determine a position of a user. These devices may include a motion sensing device, a wireless device, a gyroscope, an inertia sensor, a head tracking device, and/or the like. For example, one of Clients 215 may include head tracking goggles configured to determine positions of a user's head and also to present a three-dimensional image to the user.

Game Server 205 typically includes hardware, firmware, and/or software embodied on a computer readable medium and configured to perform the functions of Game Logic 130.

Game Server 205 includes a State Server 210 and one or more Image Generators 225. Image Generators 225 are individually referred to as Image Generator 225A, Image Generator 225B, Image Generator 225C, etc. State Server 210 is configured to maintain a state of a game using inputs received from one or more of Clients 215. Image Generators 225 are configured to render images based on the state of the game stored in Global State Memory 230 and player points of view. For example, if the game is a multi-player game different members of Image Generators 225 may be assigned to generate rendered images for different members of Clients 215. In some embodiments, Image Generator 225A is assigned to generate rendered images for Client 215A, Image Generator 225B is assigned to generate rendered images for Client 215B, and Image Generator 225C is assigned to generate rendered images for Client 215C. In these embodiments the rendered images are configured specifically for each client. For example, the rendered image generated using Image Generator 225A may be based on the point of view of a player using Client 215A, and the rendered image generated using Image Generator 225B may be based on the point of view of a player using Client 215B, etc. In other embodiments, there is not a 1-to-1 relationship between members of Image Generators 225 and Clients 215. For example, Image Generator 225A may be assigned to generate rendered images for both Client 215A and 215B.

In some embodiments, Image Generators 225 is distributed among different physical locations. For example, Image Generators 225 may be geographically distributed so as to reduce communication delays between members of Image Generators 225 and Clients 215. In some embodiments, part of Image Generator 225A is disposed near other elements of Game Server 205 and all or part of Image Generator 225A is disposed closer to a member of Clients 215. For example, part of Image Generator 225A may be disposed at an in-home server configured to provide game images to a plurality of different display devices.

The output of Image Generators 225 optionally include Flash, Silverlight, Air, Shockwave or some other standard streaming video format. For example, Image Generator 225A may be configured to output flash data representative of a partially rendered image. The output of Image Generator 225A may be compressed in a vector format that can be decompressed to a scalable image size. The decompressed image can be further rendered and displayed on one of Clients 215. The division in the rendering process between Image Generator 225A and Clients 215 is optionally selected so as to maximize the efficiency of the compression. The output of Image Generator 225A may include 2D video, 3D video, audio (speech/music/sound effects, etc.) 3D polygons, 2D vector artwork, controller movements, user interface inputs/data, global or local positioning data, player information, and/or the like.

A Video Source typically includes rendering logic, e.g., hardware, firmware, and/or software stored on a computer readable medium such as Storage. This rendering logic is configured to create video frames of the video stream based on the game state. All or part of the rendering logic is optionally disposed within a graphics processing unit (GPU). Rendering logic typically includes processing stages configured for determining the three-dimensional spatial relationships between objects and/or for applying appropriate textures, etc., based on the game state and viewpoint. The rendering logic produces raw video that is then usually encoded prior to communication to Clients. For example, the raw video may be encoded according to an Adobe Flash® standard, .wav, H.264, H.263, On2, VP6, VC-1, WMA, Huffyuv, Lagarith, MPG-x. Xvid. FFmpeg, x264, VP6-8, realvideo, mp3, or the like. The encoding process produces a video stream that is optionally packaged for delivery to a decoder on a remote device. The video stream is characterized by a frame size and a frame rate. Typical frame sizes include 800×600, 1280×720 (e.g., 720p), 1024×768, although any other frame sizes may be used. The frame rate is the number of video frames per second. A video stream may include different types of video frames. For example, the H.264 standard includes a "P" frame and an "I" frame. I-frames include information to refresh all macro blocks/pixels on a display device, while P-frames include information to refresh a subset thereof. P-frames are typically smaller in data size than are I-frames. As used herein the term "frame size" is meant to refer to a number of pixels within a frame. The term "frame data size" is used to refer to a number of bytes required to store the frame.

In some embodiments, different members of Image Generators 225 are assigned to render images for different types of Clients 215. For example, Image Generator 225A may be configured to render images for up to thirty-two members of Clients 215 having screen resolutions of 320 by 480 (pixels), Image Generator 225B may be configured to render images for up to four of Clients 215 having screen resolutions of 1920 by 1200, and Image Generator 225C may be configured to render images for one of Clients 215 having a higher image resolution. In embodiments such as these, Game Server 205 is optionally configured to assign different members of Image Generators 225 to provide rendered images to different members of Clients 215 based on needs of each client and capacity of each image generator.

The renderings performed by Image Generators 225 are based on the state of the game, specific player points of view, and optionally textures stored in Image Memory 245. Because these renderings are based on specific player points of view which are dependent on information received from Clients 215, they are customized for use on specific Members of Clients 215. The renderings generated by Image Generators 225 may be complete renderings, e.g., renderings that result in images that are ready to be presented to a player. Alternatively, they may be partial renderings. A partial rendering includes, for example, a determination of which points in a three dimensional environment are visible from a specific point of view, but not application of textures to those points that are visible. In some embodiments, audio is prepared on a member of Clients 215 while images are at least partially rendered using one of Image Generators 225, or vice-versa. In some embodiments, the type of rendering that is performed is a function of the capabilities of Clients 215 and/or the bandwidths of communications from Game Server 205 to Clients 215. For example, if Client 215A is a cellular telephone having relatively limited image processing power, then a complete rendering may be provided to Client 215A. If Client 215B is a personal computer with greater processing power, then a partial rendering may be provided to Client 215B. The renderings performed by Image Generators 225 may be configured for two or three dimensional game environments.

In some embodiments Game Server 205 is configured to deliver a discovery agent (not shown) to Clients 215. The discovery agent is configured to identify characteristics of Clients 215, e.g., rendering ability, screen size, processing power, player interface type, version information, etc., and to report these characteristics back to Game Server 205 via Network 120. The discovery agent may be automatic or controlled by a player. In some embodiments, Game Server 205 is configured to test various alternative communication channels in order to determine one having a desired quality of service, e.g. minimal communication latency.

State Server 210 is configured to maintain a global state of a game. This global state is a game state that results in inputs received from several players. The global game state is global in that it represents the states of the game environment around more than one player. The global game state may represent a subset of the state of an entire game. For example, the global game state may be a state of a specific region or instance within a game.

State Server 210 may include one or more computing devices. For example, in some embodiments, State Server 210 includes an array of interconnected servers. State Server 210 typically includes at least one processor, associated memory and at least one Input/Output 240. State Server 210 includes a Global State Memory 230 and a Consolidator 235. Global State Memory 230 is memory configured to store one or more global game state. For example, in some embodiments a game is divided into a plurality of regions and/or instances, and Global State Memory 230 is configured to store a global game state associated with each of these regions and/or instances, respectively.

Consolidator 235 is configured to receive state information from Clients 215 via Input/Output 240 and to update Global State Memory 230 using this received state information. For example, Consolidator 235 may receive state information from each of Client 215A and Client 215B. This state information may be the result of inputs by players and/or interactions between avatars within the game. These inputs include, for example, commands for an avatar to move, interactions with in-game objects, text messages, audio data. Interactions between avatars include, for example, dancing, shooting, trading, or the like between avatars. Both these inputs and interactions result in changes in a global state of the game. For example, when an avatar moves from one position to a second position, Consolidator 235 is configured to update Global State Memory 230 to reflect this change in position. Likewise, when an avatar trades an object with another avatar, consolidator 235 is configured to update Global State Memory 230 to reflect this change. The state information includes player points of view received from Clients 215 or determined from other information received from Clients 215.

Image Memory 245 includes memory configured to store video, textures, graphics, color pallets, and/or images received from External Source 220. These data are optionally used by Image Generators 225 to generate rendered images. These data are optionally generated using External Source 220.

In various embodiments, Input/Output 240 comprises a data bus, a communication port, a network interface, and/or the like. Input/Output 240 is configured to both receive state information from Clients 215 (via Network 120) and to provide all or part of a global game state stored in Global State Memory 230 to Image Generators 225. In some embodiments, members of Image Generators 225 are disposed within the same computing device as other parts of Game Server 205. In some embodiments, members of Image Generators 225 are disposed in separate computing devices. For example, Image Generators 225 may each include a processing blade within a rack. In these embodiments, the number of Clients 215 that can be supported by Game Server 205 is optionally scaled by adding additional processing blades.

Network 120 may include the internet, a telephone network, an Ethernet, a wireless network, a cellular network, a TCP/IP network, and/or the like. In some embodiments, members of Clients 215 are connected to the Internet at different locations, using different types of devices, and are used to participate in a multi-player game supported by Game Server 205. Network 120 is typically a digital network.

Clients 215 can include a wide variety of devices and are typically characterized by having at least a display, a user input and communication capabilities. Examples of Clients 215 include a telephone, a cellular telephone, a personal digital assistant, a handheld game console, a game console, a digital video recorder, a television, a personal computer, a laptop computer, a projector, and/or the like. Clients 215 may or may not have image rendering capabilities. For example, Client 215A may include a cellular telephone that does not include electronics configured to further render an image received via Network 120. Members of Clients 215 that do not have rendering capabilities are referred to herein as renderless clients. Renderless clients are unable to determine three dimensional projections and/or apply textures.

For example, in some embodiments, a renderless member of Clients 215 includes a cellular telephone that is not configured to calculate three dimensional projections nor apply textures to a surface within an image. In some embodiments, a renderless member of Clients 215 includes a personal digital assistant or cellular telephone that is not configured to calculate a three dimensional projection but does have logic (firmware, hardware and/or software embodied on a computer readable medium) configured to apply a texture to a surface within an image.

Optional External Source 220 is configured to generate information to be used by Image Generators 225. In various embodiments, this information includes video or still images, audio, the locations of objects in the real world, the occurrence of events in the real world, and/or the like. In various embodiments, the information generated using External Source 220 is real-time or time-shifted information. For example, External Source 220 may include a video camera configured to generate images of real-world events and/or position sensing devices configured for identifying positions of real world objects. These real-world events can include a game, a sporting event, movement of a vehicle, movement of a person, movement of an animal, a contest, a puzzle, and/or the like. For example, in some embodiments a real-world event includes a game show that is also shown through another medium, e.g., television. In some embodiments, the real-world event is a football (American or European) game, a race, a basketball game, a poker game, a card game, cricket game, a baseball game, a hockey game, a field and track event, a fighting event, an Olympic event, or the like. If the real-world event involves movement of objects, such as an automobile race, then External Source 220 may be configured to determine the positions of these objects. Such determination can include the use of optical object recognition, wireless signals, range finders, global positioning system or local positioning systems, or the like. The information generated by External Source 220 may also include actions that occur in the real-world, such as dealing of a card, a time-out, a time, a score, a choice made by a person, a hit, an out, a penalty, a catch, a collision, roll of a dice, and/or the like. Such information may be manually entered or gathered using sensors, optionally in real time.

The information generated using External Source 220 is optionally used for several purposes. For example, if the information includes video or still images these images may be added, by Image Generators 225, to images provided from Game Server 205 to Clients 215. These images may be added as a background, foreground, or texture. If the information includes real-world positions of objects or actions that occur in the real-world, then the information may be used to update the global game state stored in Global State Memory 230 or to control computer generated representations of the objects. For example, the real world position of a ball, vehicle or person, or the like, may be used to control the position of a computer generated representation of the ball, vehicle or person with a game environment, respectfully. The computer generated representation may be an avatar, a representation that accurately reflects visual characteristics of the real world object, and/or a representation that includes some visual features different from those of the real world object. For example, if the real world object is a vehicle, the computer generated representation may include a vehicle of a different type or a different logo, color or texture.

In some embodiments, External Source 220 is configured to receive information from Game Server 205. For example, External Source 220 may be configured to receive camera movement/selection instructions from Game Server 205. In another example, External Source 220 may be configured to receive instructions to move objects in the real-world based on instructions received from Game Server 205 and/or Clients 215. For example, a user of Client 215A may be able to control movement or other actions of a real-world object via Game Server 205. In one embodiment, External Source 220 is configured to control movement of a vehicle responsive to signals received from one of Clients 215.

Figure 3:
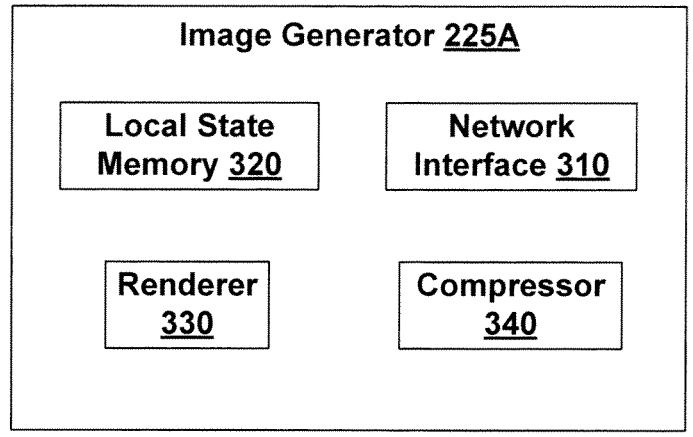
FIG. 3 illustrates an image generator, according to various embodiments of the invention.

FIG. 3 illustrates further details of Image Generator 225A, according to various embodiments of the invention. Image Generator 225A includes a Network Interface 310, an optional Local State Memory 320, a Renderer 330, and an optional Compressor 340. Image Generator 225A is configured to generate an image for delivery to Clients 215. This image may be video or a still image, fully or partially rendered, and may be configured for display on a device having particular characteristics (e.g., display resolution, memory, processing power, communication bandwidth, and/or the like). Image Generator 225A may be embodied in a single device, e.g., a processing blade, or a plurality of devices, e.g., a processing device and a separate communication device.

At a particular time, Image Generator 225A is typically associated with one or more of Clients 215, e.g., assigned to generate at least partially rendered images for those one or more of Clients 215. For example, when a player logs on to a game using Client 215A, that player's session and their avatar may be assigned to a particular member of Image Generators 225. This assignment can be based on characteristics or identity of Client 215A, processing load on members of Clients 215, location of Client 215A, availability of communication channels, account type (e.g., paid or free), a quality of service requirement, and/or the like. In some embodiments, the association between Image Generator 225A and a member of Clients 215 is independent of where in a game a player's avatar may travel. In other embodiments, the association between Image Generator 225A and a member of Clients 215 is dependent on where in a game a player's avatar travels. In these embodiments, Image Generator 225A may be associated with a specific region or instance within a game. In some embodiments, Image Generator 225A is selected for association with Client 215A based on a geographic relationship and/or a desired quality of service.

Network Interface 310 is configured for communicating to one or more of Clients 215 via Network 120. Network Interface 310 may include a network card, a router, a switch, an internet server, a modem, Ethernet interface, or the like. In various embodiments, Network Interface 310 is addressable using a MAC (machine access control) address and/or configured to communicate using DNS (domain name service) or TCP/IP (transmission control protocol/internet protocol) protocols. In some embodiments, Network Interface 310 is configured to communicate using Ethernet protocols. Network Interface 310 is optionally shared by more than one member of Clients 215. Network Interface 310 is optionally configured for sending game state information to one or more members of Clients 215.

Local State Memory 320 is configured to store part of the game state stored in Global State Memory 230. For example, in some embodiments, Local State Memory 320 is configured to store that part of a game state that is local to the location of a particular avatar. In embodiments where the association between Image Generator 225A and members of Clients 215 is independent on the location of the avatar, when an avatar moves between different regions or instances of a game, that part of the global game state that is stored in Local State Memory 320 may change. Typically, the part of the global game state stored in Local State Memory 320 includes the state of game objects, non-player characters, other players, and/or game environment that are spatially adjacent to the location of the avatar within the game environment. In embodiments where the association between Image Generator 225A and members of Clients 215 is dependent on the location of the avatar, the part of the global game state stored in Local State Memory 320 is independent of the movement of avatars. In these embodiments, when an avatar played using Client 215A moves from one location in a game to a second location in the game, the association of Client 215A may be changed to a different member of Image Generators 225 in response to this movement. The information stored in Local State Memory 320 typically includes a player point of view. The player point of view may be the point of view of the avatar or some other point of view selected by the player. For example, the player point of view may be from a point behind or above the avatar. The player point of view is the point of view, e.g., viewpoint and direction, though which the player views the game via a member of Clients 215. In some embodiments, Local State Memory 320 is optional. In these embodiments, Renderer 330 is configured to access game state information stored in Global State Memory 230.

Renderer 330 is configured to partially or fully render an image responsive to information stored in Local State Memory 320 and/or Global State Memory 230. Rendering typically includes determination of one or more objects visible from a player point of view in a three dimensional environment, proper sizing of these objects from the player point of view, and/or applying one or more texture to a surface of the visible objects. The determination of visible objects may include identifying those objects that are occluded by other objects. For example, a first object may be located between the point of view and a second object. If the first object is opaque, all or part of the second object may not be visible from the point of view. Thus, the rendering is based on the player point of view as well as locations and characteristics of other objects in the game.

Rendering optionally includes determination of an object's proper perspective size based on a distance from the point of view to the object.

Rendering optionally includes application of a texture to a surface of an object within the game environment. The texture may include a color, a pixel pattern, an image, a transparency, and/or the like. In some embodiments the texture includes image data received from External Source 220. For example, the texture may include an image of a real-world event. A texture may be applied as a background within a game environment. Application of a texture may occur in a two or three dimensional environment.

Complete rendering results in an image that is ready for display on one of Clients 215. In contrast, partial rendering results in image information that requires further rendering before being displayed as an image on one of Clients 215. For example, partial rendering may include determining which objects are visible and sizing images to proper prospective, but not application of textures to all visible surfaces. Partial rendering may include application of textures to some but not all visible surfaces. Partial rendering may include application of textures but not complete determination of which objects are visible from the player point of view. Partial rendering may include different amounts of rendering as a function of distance from an avatar. For example, distant objects may be more completely rendered relative to nearby objects, or vice-versa.

Optional Compressor 340 is configured to compress a fully or partially rendered image prior to delivery to a member of Clients 215 via Network 120. Compressor 340 may include hardware, firmware, and/or software embodied on a computer readable medium. For example, in some embodiments, Compressor 340 includes circuits configured for data compression. Compressor 340 may be configured to perform any of the compression techniques know in the art. Compressor 340 is optionally shared by more than one of Image Generators 225.

Figure 4:
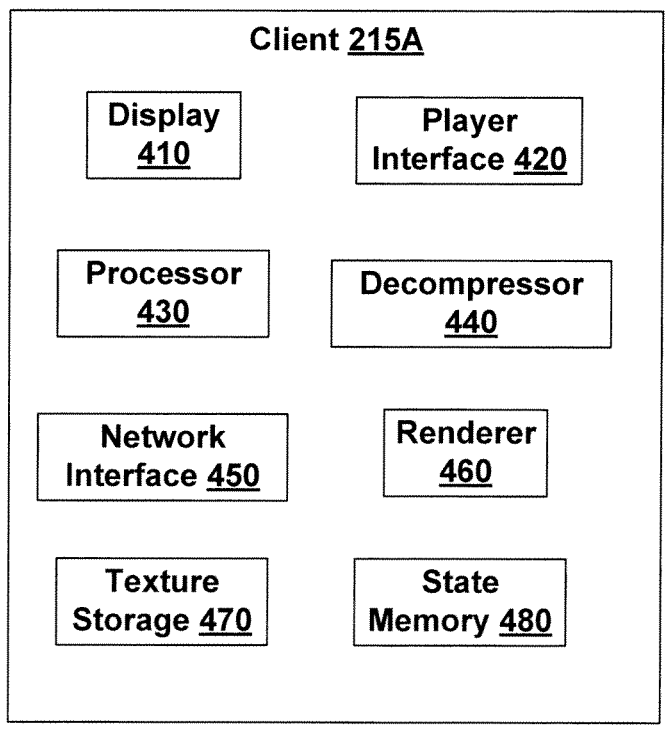
FIG. 4 illustrates a client, according to various embodiments of the invention.

FIG. 4 illustrates Client 215A, according to various embodiments of the invention. Client 215A is configured to display still and/or video images to a game player using a Display 410. Display 410 may include a liquid crystal display, a plasma display, a cathode ray tube display, a light emitting diode display, and/or the like. In some embodiments, Display 410 is detachable from other parts of Client 215A. For example, Display 410 may include a computer monitor or a television coupled to Client 215A via a cable. Display 410 is optionally configured to support a browser.

Client 215A further includes a Player Interface 420 configured for a person to interact with Client 215A. Player Interface 420 can include, for example, a keyboard, a pointing device, a joystick, buttons, switches, location sensors, a microphone, a touch sensor, a wireless remote, a position sensor, a wireless receiver, a universal serial bus port, and/or the like.

Client 215A further includes a Processor 430 configured to process data. For example, in some embodiments, Processor 430 is configured to parse received data and provide the received data to Display 410 in a form appropriate for viewing by a user. Processor 430 may include software, firmware, and/or hardware. In some embodiments, Processor 430 is configured to receive inputs from Player Interface 420 and convert those inputs into data that can be provided to Game Server 205 via Network 120.

Client 215A optionally further includes a Decompressor 440 configured to decompress a fully or partially rendered image received from Game Server 205 via Network 120. Decompressor 440 includes hardware, firmware and/or software embodied on a computer readable medium, and may be configured to perform any of the decompression techniques known in the art.

Client 215A further includes a Network Interface 450. Network Interface 450 is configured for communicating with Network Interface 310 via Network 120. Network Interface 450 may include a network card, a router, a wireless connection, a switch, an internet server, a modem, Ethernet interface, and/or the like. In various embodiments, Network Interface 310 is addressable using a MAC address and/or configured to communicate using DNS (domain name service) or TCP/IP protocols. In some embodiments, Network Interface is configured to communicate using Ethernet protocols. Network Interface 310 is optionally shared by more than one member of Clients 215. Network Interface 310 is optionally configured for sending game state information to Game Server 205 and/or one or more other members of Clients 215.

Client 215A optionally further includes a Renderer 460 configured to complete rendering of a partially rendered image received from Game Server 205. For example, Renderer 460 may be configured to apply textures to surfaces, determine object sizes according to a player viewpoint perspective, and/or complete determination of which objects are visible.

In some embodiments, textures applied using Renderer 460 are local to Client 215A, e.g., not generally available to other members of Clients 215. For example, an image generated by Client 215A or received from a source other than Game Server 205 may be used as a texture by Renderer 460. Alternatively, Client 215A may be configured to receive a texture from Game Server 205 and to apply the received texture to an object using Renderer 460. The texture applied by Renderer 460 may be stored in an optional Texture Storage 470. For example, in some embodiments, one or more textures are provide by Game Server 205 to Client 215A at one time in a game session and then applied to objects at one or more different times, in the game session (or as subsequent game session). Thus, textures may be stored in Texture Storage 470 for repeated and/or later use. In some embodiments, this reduces the amount of data that need be communicated between Game Server 205 and Client 215A.

The rendering performed by Renderer 460 may be responsive to game state information stored in an optional State Memory 480. This game state information is optionally received from Game Server 205 via Network 120, from Player Interface 420, and/or from some other source. For example, in some embodiments, Client 215A is configured to receive a partially rendered image from Game Server 205 and complete rendering of the image based on movement commands received via Player Interface 420. In some embodiments, the rendering performed by Renderer 460 is responsive to state information communicated from Global State Memory 230 and/or Local State Memory 320 to State Memory 480.

Decompressor 440 and/or Renderer 460 are optionally disposed within Processor 430. Texture Storage 470 and State Memory 480 include random access memory, volatile memory, static memory, read only memory, magnetic storage, optical storage, and/or the like.

Figure 5:
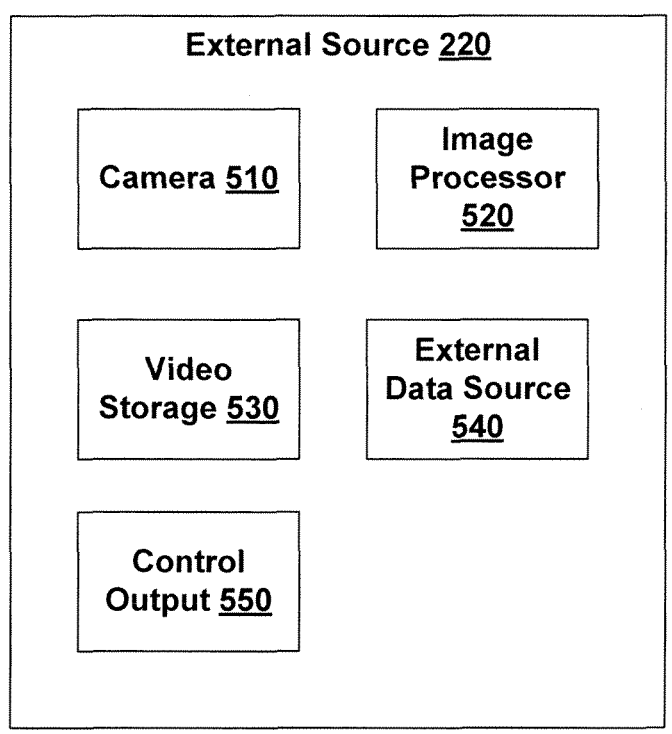
FIG. 5 illustrates an external source, according to various embodiments of the invention.

FIG. 5 illustrates further details of External Source 220, according to various embodiments of the invention. External Source 220 includes a Camera 510, an Image Processor 520, an External Data Source 540, a Video Storage 530, or various combinations thereof. For example, in some embodiments, External Source 220 includes Camera 510 and Image Processor 520 configured to record still or video images and to process these images for communication to Game Server 205 and/or members of Clients 215. In some embodiments, External Source 220 includes merely an External Data Source 540 configured to receive signals representative of identities, positions and/or orientations of real world objects.

In some embodiments, Image Processor 520 is further configured to identify objects within an image obtained using Camera 510. For example, Image Processor 520 may be configured to identify a human player in a real-world game and/or to determine a location of that player. In another example, Image Processor 520 may be configured to determine the location of a vehicle in a real-world race. In further examples, Image Processor 520 may be configured to identify a playing card, the location of a ball or puck, the location of a betting chip, the location of a roulette ball, the orientation of one or more dice, or the like. The video processed using Image Processor 520 may be real-time video or video previously stored in Video Storage 530. The images recorded using Camera 510, the identification of objects within the images, and/or the locations of these objects may be communicated to Game Server 205 and/or members of Clients 215. The locations of these objects are optionally included in the global game state and/or a local game state. Image Processor 520 is optionally disposed within Game Server 205.

Video Storage 530 can include, for example, a digital video recorder, a hard drive, an optical drive, recording tape, volatile memory, static memory, or the like.

External Data Source 540 is configured to generate or receive data regarding the state of the real world. For example, External Data Source 540 may include a wireless signal source, a range finder, a global positioning system, a local positioning system, a sensor, a computing device, and/or the like, and/or an interface therefore. In some embodiments, External Data Source 540 includes a wireless receiver configured to receive signals from physical objects in the real world. In some embodiments, External Data Source 540 includes an electrical interface, e.g., a universal serial bus, an Ethernet interface, an analog signal wire, a digital signal wire, or the like configured to receive electrical signals from an external device. For example, in some embodiments, External Data Source 540 includes an interface configured to receive an input from a human participating in a real-world event.

External Source 220 optionally further includes a Control Output 550 configured to provide signals from External Source 220 to real-world devices. These signals are optionally dependent on inputs provided by a player via a member of Clients 215. For example, in some embodiments, signals from Control Output 550 are configured to control a real-world device, e.g., a model car, according to inputs provided by a player via Player Interface 420. In various embodiments, External Source 220 is connected to a member of Clients 215 directly or via Network 120, rather than via Game Server 205.

Figure 6:
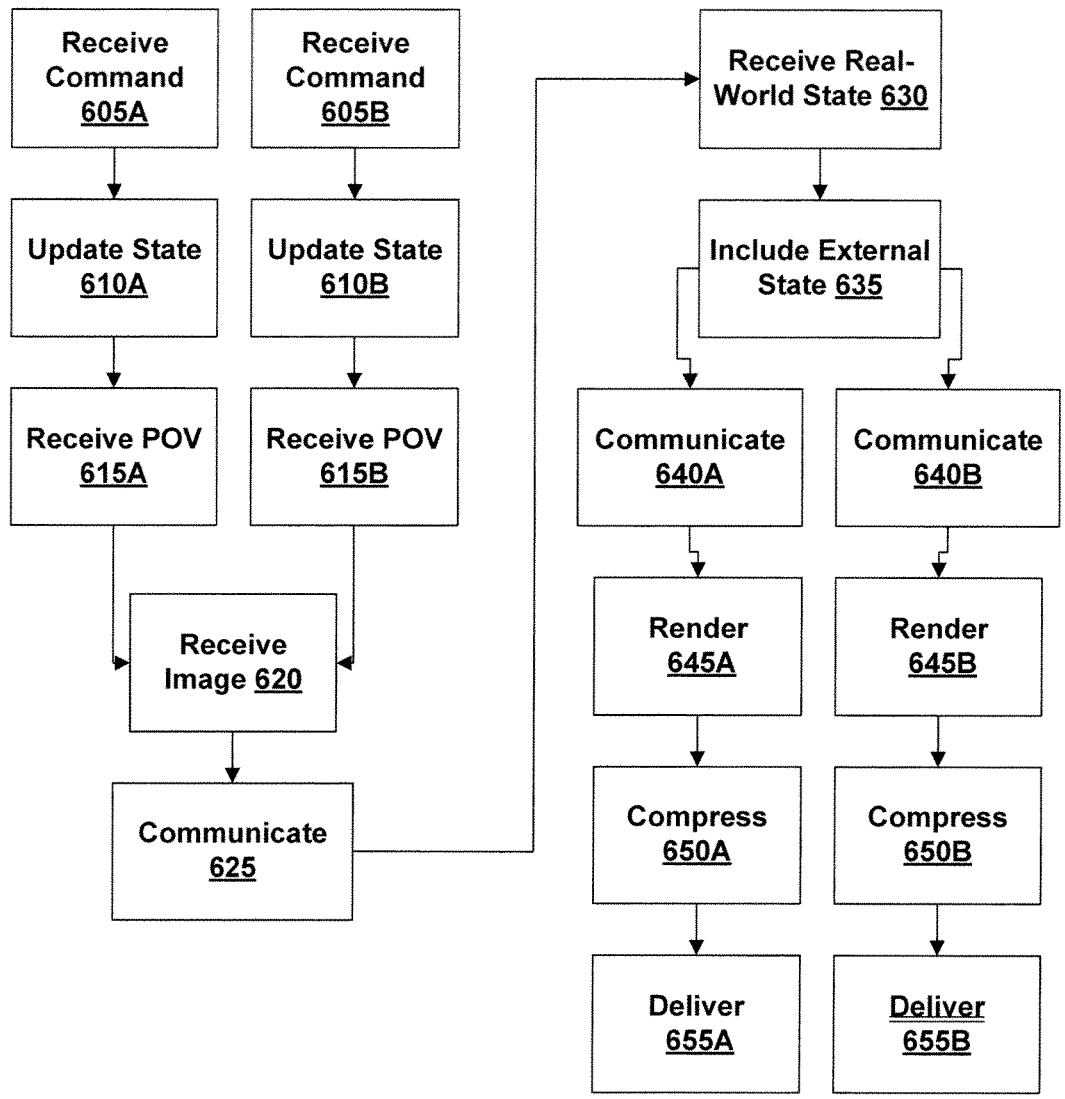
FIG. 6 illustrates methods of providing an image to one or more clients over a computing network, according to various embodiments of the invention.

FIG. 6 illustrates methods of providing an image to one or more members of Clients 215 via Network 120, according to various embodiments of the invention. In FIG. 6 two processes are illustrated, one having step identifiers ending in "A" and one having step identifiers ending in "B." For the purposes of example, one can assume that the "A" process is performed to deliver an image to Client 215A and the "B" process is performed to deliver an image to Client 215B. These processes may be performed in parallel or in series and need not be synchronized with each other. In various embodiments, one, two, three, four or more such processes may be performed using Game Server 205.

In a Receive Command Step 605A, a first command is received at Game Server 205 from a first player via Client 215A and Network 120. This command may include a movement, a change in player point of view, an interaction with an object within the game, an interaction with the game environment, an interaction with an avatar of another player, and/or the like. In various embodiments, the command is received using TCP/IP protocols, Ethernet protocols, or other communication protocols discussed herein. For example, in some embodiments the command is received over the internet.

In a Receive Command Step 605B, a second command is received at Game Server 205 from a second player via Client 215B and Network 120. Typically, the second player will be at a different location than the first player. For example, Client 215A and Client 215B may be located in different cities and be addressed using different MAC addresses.

In an Update State Step 610A, part of the global game state stored in Global State Memory 230 is updated using the received first command. For example, if the first command is a movement command then a position of an avatar of the first player may be changed in the global game state. In an Update State Step 610B, part of the global game state is updated using the received second command.

In a Receive POV Step 615A, a player point of view (POV) is received by Game Server 205 from Client 215A via Network 120. As discussed elsewhere herein, the player point of view can be, for example, the point of view of an avatar or some other point of view selected by the player. In a Receive POV Step 615B, a different player point of view is received by Game Server 205 from Client 215B via Network 120.

In an optional Receive Image Step 620, an image is received from External Source 220, optionally via Network 120. The received image may be a still or video image and is optionally an image of a real-world event. For example, the received image may be an image of an event recorded using a video camera. The image can be real-time or delayed. The received image is optionally stored in Image Memory 245.

In an optional Communicate Step 625, the image received in Receive Image Step 620 is communicated to one or more of Image Generators 225. This communication may be via a bus, via a local computing network, via an Ethernet, and/or the like In an optional Receive Real-World State Step 630, information regarding the state of a real-world object or event is received by Game Server 205, optionally from External Source 220 via Network 120. This state information may include a game score, a vehicle position, the position of a person, as well as other examples discussed herein. In some embodiments the state information is derived from the image received in Receive Image Step 620. This derivation may be accomplished using Image Processor 520 and may take place on External Source 220 or on Game Server 205. For example, in some embodiments the image is processed to determine locations of objects in the real world.

In an optional Include External State Step 635, the information regarding the state of a real-world object or event is included in the global game state stored in Global State Memory 230.

In an optional Communicate Step 640A, the player point of view received in Receive POV Step 615A and at least part of the global game state is communicated from State Server 210 to one of Image Generators 225, e.g., Image Generator 225A. In various embodiments, this communication includes one of Image Generators 225 reading directly from Global State Memory 230, communication via a bus, communication via a local computing network, communication via an Ethernet, and/or the like. Communicate Step 640A optionally includes establishing an association between Client 215A and Image Generator 225A. As is discussed elsewhere herein, this association may be based on a variety of factors such as the location of an avatar or the capabilities of Client 215A.

In an optional Communicate Step 640B, the player point of view received in Receive POV Step 615B and at least part of the global game state is communicated from State Server 210 to one of Image Generators 225, e.g., Image Generator 225A or Image Generator 225B. The part of the global game state communicated in Communicate Step 640B may be the same or different than the part of the global game state communicated in Communicate Step 640A. For example, if the avatars of the first player and the second player are in different regions or instances of a game environment, then the communicated parts of the global game state may have little or nothing in common, while if the avatars are in the same region or instance the communicated parts may be the same or have significant overlap. Communicate Steps 640A and 640B are optional in embodiments wherein Image Generators 225 are configured to read data directly from Global State Memory 230.

In a Render Step 645A, a first image is at least partially rendered using Image Generator 225A based on the game state communicated to Image Generator 225A in Communicate Step 640A. As discussed elsewhere herein, the rendering can result in a fully rendered image or an image in which part of the rendering process is incomplete.

In a Render Step 645B, a second image is at least partially rendered using Image Generator 225B based on the game state communicated to Image Generator 225B in Communicate Step 640B. As discussed elsewhere herein, the rendering can result in a fully rendered image or an image in which part of the rendering process is incomplete. In some embodiments, the rendering performed in Render Step 645A is different than that of Render Step 645B.

In an optional Compress Step 650A, the first image rendered in Render Step 645A is compressed using Compressor 340. In an optional Compress Step 650B, the second image rendered in Render Step 645B is compressing using Compressor 340.

In a Deliver Step 655A, the first image is delivered from Image Generator 225A to Client 215A via Network 120. In a Deliver Step 655B, the second image is delivered from Image Generator 225B to Client 215B. As discussed elsewhere herein, these deliveries may be accomplished using TCP/IP protocols, Ethernet protocols, or the like.

Figure 7:
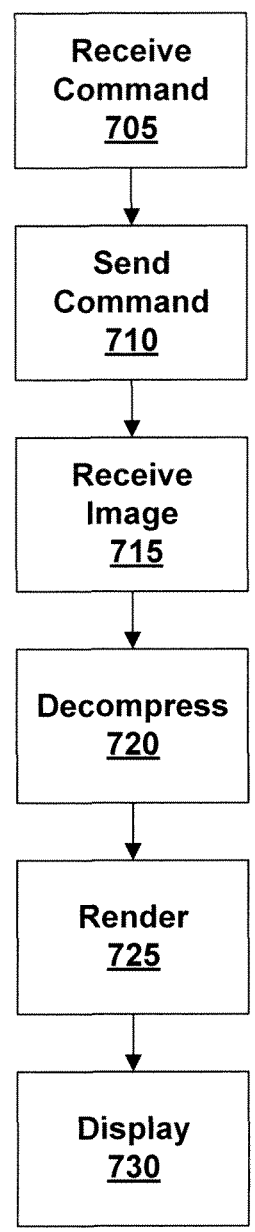
FIG. 7 illustrates methods of using an image received via a computing network, according to various embodiments of the invention.

FIG. 7 illustrates methods of using an image received via Network 120, according to various embodiments of the invention. These methods may be performed by, for example, a member of Clients 215. In these methods a fully or partially rendered image is received from Game Server 205 and displayed to a player using Display 410. The received image is typically responsive to commands entered by game players using one or more of Clients 215.

In a Receive Command Step 705, a command is received by Client 215A via Player Interface 420. As described elsewhere herein, this command may be, for example, a movement command.

In a Send Command Step 710, Network Interface 450 is used to send the command received in Receive Command Step 705 to Game Server 205.

In a Receive Image Step 715, an at least partially rendered image is received by Client 215A from Game Server 205 via Network 120. The at least partially rendered image is based at least in part on the command sent in Send Command Step 710 and may be fully or partially rendered.

In an optional Decompress Step 720, the at least partially rendered image received in Receive Image Step 715 is decompressed using Decompressor 440.

In an optional Render Step 725, the at least partially rendered image received in Receive Image Step 715 is rendered to produce a fully rendered image using Renderer 460. For example, in one embodiment, the at least partially rendered image does not include textures applied to some surfaces and Render Step 725 includes application of textures to these surfaces. This results in an image that is partially rendered using Image Generator 225A and partially rendered using Renderer 460. The various parts of the rendering process that can take place on each of these devices are discussed elsewhere herein. Render Step 725 is optional when a fully rendered image is received from Game Server 205 in Receive Image Step 715.

In a Display Step 730, the fully rendered image produced in Render Step 725 or received in Receive Image Step 715 is displayed to a player using Display 410.

Several embodiments are specifically illustrated and/or described herein. However, it will be appreciated that modifications and variations are covered by the above teachings and within the scope of the appended claims without departing from the spirit and intended scope thereof. For example, the systems and methods describe herein may be used to generate a fully rendered image that is used to update part of a larger image. Different parts of an image may be rendered on different devices. For example, part of an image may be rendered on Image Generator 225A and part of an image may be rendered on Client 215A. In the same example, Image Generator 225A and Client 215A may perform different steps in the rendering process. All or part of Game System 200 is optionally disposed on a vehicle such as a car, airplane, ship, recreational vehicle, bus, or the like. All or part of Game System 200 may be disposed in a hotel, school, apartment building, or the like. In some embodiments the systems and methods discussed herein are implemented in a peer-to-peer architecture rather than a client server architecture. In these embodiments at least partially rendered images are generated on one peer for display on another peer.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

What is claimed is:

1. A method executed on gaming system, comprising:
    receiving a connection request from a remote client to access a player interface of the game system, the connection request being received via a computing network;
    receiving a command for a video game from the remote client via the player interface executed by the gaming system, the command being received via the computing network; executing the game based at least in part on the received command; and
    sending compressed images from the gaming system via the computing network to the remote client, the compressed images including an image of the video game rendered based on a game state of the video game and a point of view of a player connected via the remote client, the game state being based in part on the command, wherein the compressed images include partially rendered images that require additional rendering by the remote client;
    the compressed images configured to be decompressed by the remote client; and
    the remote client is configured to perform additional texture rendering for display of the decompressed images for viewing by the player.

2. The method of claim 1, wherein the partially rendered images by the game system do not include all textures applied to surfaces of the image of the video game rendered for the point of view of the player.

3. The method of claim 1, wherein the compressed images are received via the internet.

4. The method of claim 1, wherein the compressed images are compressed video frames.

5. The method of claim 4, wherein the compressed images are generated using an encoder that encodes images using one of Adobe Flash® standard, or .wav, or .mpg, or H.264, or H.263, or On2, or VP6, or VC-1, or WMA, or Huffyuv, or Lagarith, or MPG-x., or Xvid., or FFmpeg, or x264, or VP6-8, or realvideo, or mp3.

6. The method of claim 5, wherein the remote client uses a decoder that corresponds to an encoder used for the compressing of images.

7. A method executed by a gaming computer, comprising:
- receiving, by the gaming computer, a command from a first player via a first client over a computing network;
- updating, by the gaming computer, a game state of a video game based on the command received from the first player;
- receiving, by the gaming computer, a first point of view of the first player via the computing network;
- communicating, by the gaming computer, at least part of the game state to a first image generator executed by the gaming computer;
- sending, by the gaming computer, via the computing network, to the first client a first image based on the game state and the first point of view using the first image generator, wherein the first image generator produces partially rendered images that require additional rendering by the first client to apply texturing based on the first point of view of the first player, the partially rendered images being video frames; and
- the video frames being sized to fit a screen size upon rendering by the first client.

8. The method of claim 7, wherein the first client is a remote device, and the gaming computer is remotely accessed by the remote device.

9. The method of claim 8, wherein the first image is one of a plurality of images representing video images, the video images being of game play of the video game.

10. The method of claim 9, wherein the video images are compressed by the gaming computer before being sent to the first client, the first client is configured to decompress the video images for presentation on a display of the first client.

11. The method of claim 9, wherein the compressing is processed by an encoder that encodes the video images on the gaming computer using one of Adobe Flash® standard, or .wav, or .mpg, or H.264, or H.263, or On2, or VP6, or VC-1, or WMA, or Huffyuv, or Lagarith, or MPG-x., or Xvid., or FFmpeg, or x264, or VP6-8, or realvideo, or mp3.

12. The method of claim 11, wherein the first client uses a decoder that corresponds to the encoder used for the compressing of video images.

13. The method of claim 7, wherein the partially rendered images by the gaming computer do not include all textures applied to surfaces of the first image of the video game rendered for first the point of view of the first player.

14. The method of claim 1, wherein the partial rendering is carried out at least in part by a graphics processing unit (GPU) of the gaming system.

15. The method of claim 14, further comprising,
- determining to apply the partial rendering instead of full rendering based at least in part on the point of view or a determined capability of the remote client.

16. The method of claim 7, wherein the partial rendering is carried out at least in part by a graphics processing unit (GPU) of the gaming computer.

17. The method of claim 16, further comprising,
- determining to apply the partial rendering instead of full rendering based at least in part on the first point of view or a determined capability of the first client.

* * * * *